United States Patent
Schulz

(10) Patent No.: US 11,413,855 B2
(45) Date of Patent: Aug. 16, 2022

(54) ETHYLENE-BASED POLYMERS AND ARTICLES MADE THEREFROM

(71) Applicant: ExxonMobil Chemical Patents Inc., Baytown, TX (US)

(72) Inventor: Anja S. Schulz, Sterrebeek (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 1262 days.

(21) Appl. No.: 14/441,431

(22) PCT Filed: Nov. 19, 2013

(86) PCT No.: PCT/US2013/070647
§ 371 (c)(1),
(2) Date: May 7, 2015

(87) PCT Pub. No.: WO2014/088791
PCT Pub. Date: Jun. 12, 2014

(65) Prior Publication Data
US 2015/0258754 A1 Sep. 17, 2015

Related U.S. Application Data

(60) Provisional application No. 61/734,260, filed on Dec. 6, 2012, provisional application No. 61/733,778, filed on Dec. 5, 2012.

(30) Foreign Application Priority Data

Feb. 14, 2013 (EP) .................................... 13155243

(51) Int. Cl.
*B32B 27/32* (2006.01)
*B32B 27/08* (2006.01)
(Continued)

(52) U.S. Cl.
CPC ................ *B32B 27/32* (2013.01); *B32B 7/02* (2013.01); *B32B 25/042* (2013.01); *B32B 25/08* (2013.01);
(Continued)

(58) Field of Classification Search
None
See application file for complete search history.

(56) References Cited

U.S. PATENT DOCUMENTS 4,543,399 A 9/1985 Jenkins, III et al.
4,588,790 A 5/1986 Jenkins, III et al.
(Continued)

FOREIGN PATENT DOCUMENTS

EP 634421 1/1995
EP 794200 9/1997
(Continued)

OTHER PUBLICATIONS

Macromol. Chem. Phys.,C29 (2&3), pp. 201-317.
(Continued)

*Primary Examiner* — Scott R. Walshon
*Assistant Examiner* — Thomas A Mangohig

(57) ABSTRACT

This disclosure relates to films particularly suitable for stretch hood applications. More particularly, this disclosure relates to multi-layer films particularly suitable for stretch hood applications comprising one or more intermediate layers including a blend of a propylene-based elastomer and a linear low density polyethylene.

13 Claims, 2 Drawing Sheets

(51) Int. Cl.
   *B32B 7/02*    (2019.01)
   *B32B 25/08*   (2006.01)
   *B32B 25/04*   (2006.01)
   *B32B 25/14*   (2006.01)
   *B32B 27/30*   (2006.01)
   *B65D 65/38*   (2006.01)
   *B65D 75/00*   (2006.01)

(52) U.S. Cl.
   CPC .............. *B32B 25/14* (2013.01); *B32B 27/08* (2013.01); *B32B 27/306* (2013.01); *B65D 65/38* (2013.01); *B65D 75/006* (2013.01); *B32B 2250/05* (2013.01); *B32B 2250/24* (2013.01); *B32B 2250/242* (2013.01); *B32B 2270/00* (2013.01); *B32B 2307/50* (2013.01); *B32B 2307/51* (2013.01); *B32B 2307/582* (2013.01); *B32B 2307/748* (2013.01); *B32B 2553/00* (2013.01); *Y10T 428/31913* (2015.04)

(56) References Cited

U.S. PATENT DOCUMENTS

| | | | |
|---|---|---|---|
| 5,028,670 A | | 7/1991 | Chinh et al. |
| 5,317,036 A | | 5/1994 | Brady, III et al. |
| 5,352,749 A | | 10/1994 | DeChellis et al. |
| 5,376,439 A | * | 12/1994 | Hodgson .............. B32B 27/322 428/220 |
| 5,405,922 A | | 4/1995 | DeChellis et al. |
| 5,436,304 A | | 7/1995 | Griffin et al. |
| 5,453,471 A | | 9/1995 | Bernier et al. |
| 5,462,999 A | | 10/1995 | Griffin et al. |
| 5,466,649 A | | 11/1995 | Jejelowo |
| 5,504,172 A | | 4/1996 | Imuta et al. |
| 5,616,661 A | | 4/1997 | Eisinger et al. |
| 5,627,242 A | | 5/1997 | Jacobsen et al. |
| 5,665,818 A | | 9/1997 | Tilston et al. |
| 5,668,228 A | | 9/1997 | Chinh et al. |
| 5,677,375 A | | 10/1997 | Rifi et al. |
| 5,752,362 A | | 5/1998 | Eichbauer |
| 5,907,942 A | | 6/1999 | Eichbauer |
| 6,225,426 B1 | | 5/2001 | Gillis et al. |
| 6,476,171 B1 | | 11/2002 | Lue et al. |
| 6,602,598 B1 | | 8/2003 | Simpson et al. |
| 6,881,800 B2 | | 4/2005 | Friedersdorf |
| 6,992,158 B2 | | 1/2006 | Datta et al. |
| 7,232,871 B2 | | 6/2007 | Datta et al. |
| 7,951,873 B2 | | 5/2011 | Best et al. |
| 2003/0118853 A1 | | 6/2003 | Cook et al. |
| 2008/0032148 A1 | * | 2/2008 | Lee .......................... B32B 27/32 428/523 |
| 2008/0311368 A1 | | 12/2008 | Tukachinsky |
| 2011/0003129 A1 | * | 1/2011 | Mandare ................ B32B 27/32 428/220 |

FOREIGN PATENT DOCUMENTS

| | | |
|---|---|---|
| EP | 802202 | 10/1997 |
| WO | 93/03093 | 2/1993 |
| WO | 96/08520 | 3/1996 |
| WO | 00/01745 | 1/2000 |
| WO | 02/36651 | 5/2002 |

OTHER PUBLICATIONS

Macromolecules, 2000, 33, 7489-7499.
Scholte, et al., J. App. Polymer Sci., 29, pp. 3763-3782 (1984).
Advances in Polymer Science, vol. 7, pp. 386-448 (1970).
H. N. Cheng, Macromolecules, 17, 1950 (1984).
Polymer, vol. 30 (1989), p. 1350.
Macromolecules, vol. 34, No. 19, p. 6812 (2001).
Wild, et al., J. Poly. Sci. Poly. Phys. Ed., vol. 20, p. 441 (1982).

* cited by examiner

ETHYLENE-BASED POLYMERS AND ARTICLES MADE THEREFROM

CROSS-REFERENCE OF RELATED APPLICATIONS

This application is a National Stage Application of International Application No. PCT/US2013/070647, filed Nov. 19, 2013, which claims the benefit of U.S. Provisional Application No. 61/733,778, filed Dec. 5, 2012, and U.S. Provisional Application No. 61/734,260, filed Dec. 6, 2012, the disclosures of which are fully incorporated herein by their reference.

FIELD OF THE INVENTION

This disclosure relates to films particularly suitable for stretch hood applications. More particularly, this disclosure relates to multi-layer films particularly suitable for stretch hood applications comprising one or more intermediate layers comprising a blend of a propylene-based elastomer and a linear low density polyethylene.

BACKGROUND OF THE INVENTION

In commercial packaging art, individual articles as well as bundles of articles, including bundles of articles on pallets, are frequently packaged using so called stretch cling film in a stretch wrapping technique. In the stretch wrapping technique, a thin web of film is stretched and applied under tension around the articles to be wrapped or bundled. After wrapping is complete, the film attempts to relax and thus applies a compressive force on the bundled articles prohibiting movement. It is desired that the stretch film have some inherent cling such that it will adhere to itself, and prevent relaxation back to its unstretched state so that the film will not unwrap and cause slippage of the stretched overlaid film layers. Given the importance and usefulness of these films, improvements in this area are highly desirable. Background references included are U.S. Pat. Nos. 5,752,362, 5,907,942, and 6,602,598; Application Publication Nos. 2003/1188536 and 2008/311368.

SUMMARY OF THE INVENTION

In one aspect, embodiments described herein provide a multilayer film, comprising: a) first and second outer layers; b) an inner layer interposing the first and second outer layers, the inner layer comprising 30.0 to 50.0 wt % of a first propylene-based elastomer or a polyethylene having a $g'_{vis}$ of 0.50 to 0.85; c) a first polyethylene-containing intermediate layer interposing the first outer layer and the inner layer, the first intermediate layer comprising 10.0 to 30.0 wt % of a second propylene-based elastomer, and d) a second polyethylene-containing intermediate layer interposing the inner layer and the second outer layer, the second intermediate layer 10.0 to 30.0 wt % of a third propylene-based elastomer. Particular films include those having a positive slope in the strain-strain curve in the region between 20.0% and 200.0% strain, and a stress value ≥8.5 MPa at strain of 20.0%.

DETAILED DESCRIPTION OF EMBODIMENTS OF THE INVENTION

Figure 1:
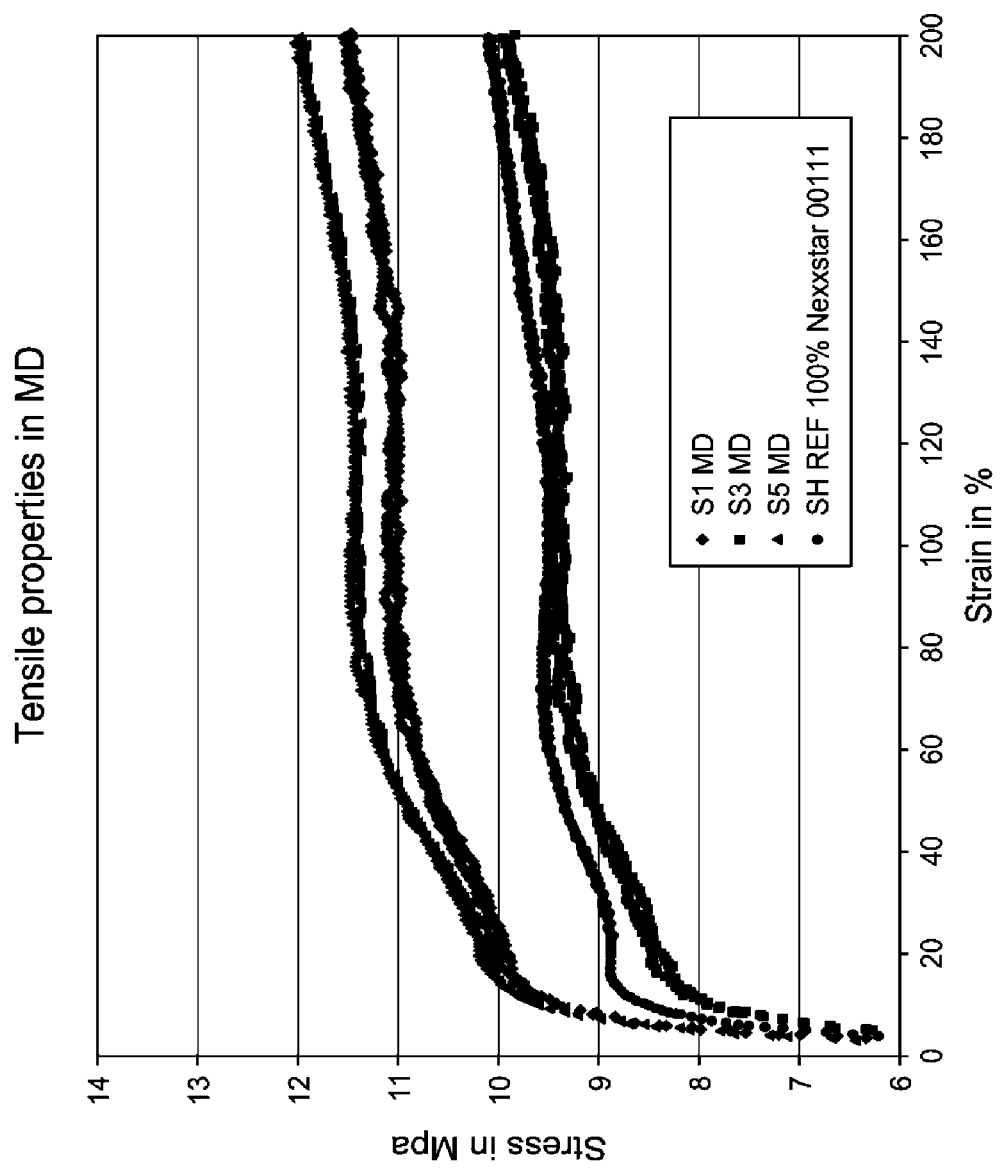
FIG. 1 depicts the Stress vs. Strain plot for particular films.

Embodiments of the invention provide multilayer films structures having improved performance, particularly in properties that are desirable for stretch hood applications. For example, embodiments of the invention provide multilayer films having a relatively high F(end) value, targeted elastic recovery performance, and improved performance in Stress/Strain behavior.

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, $R^L$ and an upper limit, $R^U$, is disclosed, any number falling within the range is specifically disclosed. In particular, the following numbers within the range are specifically disclosed: $R=R^L + k*(R^U-R^L)$ wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

Unless stated otherwise, all weight percentages of components in a film layer are based on the total weight of the total weight of the respective film layer.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to ethylene, hexene, and diene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a blend containing one or more polyethylene components.

First Ethylene-Based Polymers (PE1)

First ethylene-based polymers comprise ≥50.0 wt % of polymer units derived from ethylene and ≤50.0 wt % preferably 1.0 wt % to 35.0 wt %, even more preferably 1 wt % to 6 wt % of polymer units derived from a $C_3$ to $C_{20}$ alpha-olefin comonomer (preferably hexene or octene). First ethylene-based polymers preferably have a composition distribution breadth index (CDBI) of 60.0% or more, preferably 60.0% to 80.0%, preferably 65.0% to 80.0%. In another preferred embodiment, the ethylene copolymer has a density of 0.910 to 0.950 g/cm³ (preferably 0.915 to 0.940 g/cm³, preferably 0.918 to 0.925 g/cm³) and a CDBI of 60.0% to 80.0%, preferably between 65% and 80%. First ethylene-based polymers may have a melt index ($I_{2.16}$) according to ASTM D1238 (190° C./2.16 kg) of 0.5 to 5.0 g/10 min., particularly 0.8 to 1.5 g/10 min. Particularly suitable first ethylene-based polymers have a density of 0.915 to 0.925 g/cm³, a melt index ($I_{2.16}$) of 0.8 to 1.2 g/10 min., and a CDBI of 60.0% to 80.0%, preferably between 65% and 80%. First polyethylenes are generally considered linear, meaning they have a $g'_{vis}$ as discussed herein below ≥0.98. Some such polyethylenes are available from ExxonMobil Chemical Company under the tradename Exceed™ mPE.

The Second Ethylene-Based Polymer (PE2)

The second ethylene-based polymer compositions herein refer to a polyethylene copolymer having about 99.0 to about 80.0 wt %, 99.0 to 85.0 wt %, 99.0 to 87.5 wt %, 99.0 to 90.0 wt %, 99.0 to 92.5 wt %, 99.0 to 95.0 wt %, or 99.0 to 97.0 wt %, of polymer units derived from ethylene and about 1.0 to about 20.0 wt %, 1.0 to 15.0 wt %, 1.0 to 12.5 wt %, 1.0 to 10.0 wt %, 1.0 to 7.5 wt %, 1.0 to 5.0 wt %, or 1.0 to 3.0 wt % of polymer units derived from one or more $C_3$ to $C_{20}$ α-olefin comonomers, preferably $C_3$ to $C_{10}$ α-olefins, and more preferably $C_4$ to $C_8$ α-olefins. The α-olefin comonomer may be linear or branched, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene being most preferred.

Typically, second ethylene-based polymers also have a Composition Distribution Breadth Index (CDBI) of at least 70%, preferably ≥80.0%, preferably ≥85.0%, preferably ≥90.0%; e.g., 70.0 to 98%, 80.0 to 95.0%, or 85.0 to 90.0%.

Second ethylene-based polymers preferably have a melt index, $I_{2.16}$, of about 0.05 to about 0.5 g/10 min., particularly 0.1 to 0.5 g/10 min., or 0.3 to 0.8 g/10 min., more particularly 0.4 to 0.6 g/10 min., as determined in accordance with ASTM D-1238 under a load of 2.16 kg and at a temperature of 190° C.

Particular second ethylene-based polymers have a density of from about 0.910 to about 0.940 g/cm³; more particularly of 0.915 to 0.925 g/cm³, or of 0.918 to 0.922 g/cm³ determined using chips cut from plaques compression molded in accordance with ASTM D-1928 Procedure C, aged in accordance with ASTM D-618 Procedure A, and measured as specified by ASTM D-1505.

Typically, although not necessarily, second ethylene-based polymers have a molecular weight distribution (MWD, defined as $M_w/M_n$) of about 2.5 to about 5.5, preferably 4.0 to 5.0.

Second ethylene-based polymers may also be characterized by an averaged 1% secant modulus (M) of from 10,000 to 60,000 psi (pounds per square inch), and a relation between M and the dart drop impact strength in g/mil (DIS) complying with formula (A):

$$DIS \geq 0.8*[100+e^{(11.71-0.000268M+2.183\times10^{-9}M^2)}] \quad (A)$$

where "e" represents 2.7183, the base Napierian logarithm, M is the averaged modulus in psi, and DIS is the 26 inch dart impact strength. The DIS is preferably from about 120 to about 1000 g/mil, even more preferably, from about 150 to about 800 g/mil.

The relationship of the Dart Impact Strength to the averaged 1% secant modulus is thought to be an indicator of long-chain branching in the ethylene-based polymer. Thus, alternatively ethylene-based polymers of certain embodiments may be characterized as having long-chain branches. Long-chain branches for the purposes of this invention represent the branches formed by reincorporation of vinyl-terminated macromers, not the branches formed by incorporation of the comonomers. The number of carbon atoms on the long-chain branches ranges from a chain length of at least one carbon more than two carbons less than the total number of carbons in the comonomer to several thousands. For example, a long-chain branch of an ethylene/hexene ethylene-based polymer is at least five (5) carbons in length (i.e., 6 carbons less 2 equals 4 carbons plus one equals a minimum branch length of five carbons for long-chain branches). Particular ethylene-based polymers have a 0.05 to 1.0, particularly 0.05 to 0.5, 0.1 to 0.4, or 0.2 to 0.3, long-chain branches per 1000 carbon atoms. Ethylene-based polymers having levels of long-chain branching greater than 1.0 long-chain branch per 1000 carbon atoms may have some beneficial properties, e.g., improved processability, shear thinning, and/or delayed melt fracture, and/or improved melt strength.

Various methods are known for determining the presence of long-chain branches. For example, long-chain branching can be determined using $^{13}C$ nuclear magnetic resonance (NMR) spectroscopy and to a limited extent; e.g., for ethylene homopolymers and for certain copolymers, and it can be quantified using the method of Randall (Journal of Macromolecular Science, Rev. Macromol. Chem. Phys., C29 (2&3), p. 285-297). Although conventional $^{13}C$ NMR spectroscopy cannot determine the length of a long-chain branch in excess of about six carbon atoms, there are other known techniques useful for quantifying or determining the presence of long-chain branches in ethylene-based polymers, such as ethylene/1-octene interpolymers. For those ethylene-based polymers wherein the $^{13}C$ resonances of the comonomer overlap completely with the $^{13}C$ resonances of the long-chain branches, either the comonomer or the other monomers (such as ethylene) can be isotopically labeled so that the long-chain branches can be distinguished from the comonomer. For example, a copolymer of ethylene and 1-octene can be prepared using $^{13}C$-labeled ethylene. In this case, the resonances associated with macromer incorporation will be significantly enhanced in intensity and will show coupling to neighboring $^{13}C$ carbons, whereas the octene resonances will be unenhanced.

Alternatively, the degree of long-chain branching in ethylene-based polymers may be quantified by determination of the branching index. The branching index g' is defined by the following equation:

$$g' = \left.\frac{IV_{Br}}{IV_{Lin}}\right|_{M_w}$$

where g' is the branching index, $IV_{Br}$ is the intrinsic viscosity of the branched ethylene-based polymer and $IV_{Lin}$ is the intrinsic viscosity of the corresponding linear ethylene-based polymer having the same weight average molecular weight and molecular weight distribution as the branched ethylene-based polymer, and in the case of copolymers and terpolymers, substantially the same relative molecular proportion or proportions of monomer units. For the purposes, the molecular weight and molecular weight distribution are considered "the same" if the respective values for the branched polymer and the corresponding linear polymer are within 10% of each other. Preferably, the molecular weights are the same and the MWD of the polymers are within 10% of each other. A method for determining intrinsic viscosity of polyethylene is described in Macromolecules, 2000, 33, 7489-7499. Intrinsic viscosity may be determined by dissolving the linear and branched polymers in an appropriate solvent, e.g., trichlorobenzene, typically measured at 135° C. Another method for measuring the intrinsic viscosity of a polymer is ASTM D-5225-98—Standard Test Method for Measuring Solution Viscosity of Polymers with a Differential Viscometer, which is incorporated by reference herein in its entirety.

The branching index, g' is inversely proportional to the amount of branching. Thus, lower values for g' indicate relatively higher amounts of branching. The amounts of short and long-chain branching each contribute to the branching index according to the formula: $g'=g'_{LCB} \times g'_{SCB}$. Thus, the branching index due to long-chain branching may be calculated from the experimentally determined value for g' as described by Scholte, et al., in J. App. Polymer Sci., 29, pp. 3763-3782 (1984), incorporated herein by reference.

Typically, such polyethylenes have a $g'_{vis}$ of 0.85 to 0.98, particularly, 0.87 to 0.97, 0.89 to 0.97, 0.91 to 0.97, or 0.93 to 0.95.

Such polyethylenes may be made by any suitable polymerization method (including solution or slurry polymerization methods) may be used, second ethylene-based polymers of the present invention may be readily obtained via a continuous gas phase polymerization using supported catalyst comprising an activated molecularly discrete catalyst in the substantial absence of an aluminum alkyl based scavenger (e.g., triethylaluminum (TEAL), trimethylaluminum (TMAL), triisobutyl aluminum (TIBAL), tri-n-hexylaluminum (TNHAL), and the like).

Zirconium transition metal metallocene-type catalyst systems are particularly suitable. Non-limiting examples of metallocene catalysts and catalyst systems useful in practicing the present invention include those described in, U.S. Pat. Nos. 5,466,649, 6,476,171, 6,225,426, and 7,951,873; and in the references cited therein, all of which are fully incorporated herein by reference. Particularly useful catalyst systems include supported dimethylsilyl bis(tetrahydroindenyl) zirconium dichloride.

Supported polymerization catalyst may be deposited on, bonded to, contacted with, or incorporated within, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

Typically in a gas phase polymerization process, a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399, 4,588,790, 5,028,670, 5,317,036, 5,352,749, 5,405,922, 5,436,304, 5,453,471, 5,462,999, 5,616,661, and 5,668,228 all of which are fully incorporated herein by reference.)

Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. The reactor pressure may vary from 100 psig (680 kPag)-500 psig (3448 kPag), or in the range of from 200 psig (1379 kPag)-400 psig (2759 kPag), or in the range of from 250 psig (1724 kPag)-350 psig (2414 kPag). The reactor operated at a temperature in the range of 60° C. to 120° C., 60° C. to 115° C., 70° C. to 110° C., 70° C. to 95° C., or 85° C. to 95° C. The productivity of the catalyst or catalyst system is influenced by the main monomer partial pressure. The mole percent of the main monomer, ethylene, is from 25.0-90.0 mole percent, or 50.0-90.0 mole percent, or 70.0-85.0 mole percent, and the monomer partial pressure is in the range of from 75 psia (517 kPa)-300 psia (2069 kPa), or 100-275 psia (689-1894 kPa), or 150-265 psia (1034-1826 kPa), or 200-250 psia (1378-1722 kPa), which are typical conditions in a gas phase polymerization process.

Other gas phase processes contemplated by the process of the invention include those described in U.S. Pat. Nos. 5,627,242, 5,665,818 and 5,677,375, and European published patent applications EP-A-0 794 200, EP-A-0 802 202, and EP-B-0 634 421 all of which are herein fully incorporated by reference.

It may be beneficial in slurry or gas phase processes, to operate in the substantial absence of or essentially free of any scavengers, such as triethylaluminum, trimethylaluminum, triisobutylaluminum, and tri-n-hexylaluminum and diethyl aluminum chloride and the like. Such processes are described in PCT Publication No. WO 96/08520, which is herein fully incorporated by reference.

Additionally, the use of a process continuity aid, while not required, may be desirable in any of the foregoing processes. Such continuity aids are well known to persons of skill in the art and include, for example, metal stearates.

Third Ethylene-Based Polymers (PE3)

The third ethylene-based polymer is a polyethylene having polyethylene having a $g'_{vis}$ as described above of 0.50 to 0.85, particularly 0.50 to 0.80, 0.50 to 0.75, 0.50 to 0.70, 0.50 to 0.65, 0.50 to 0.60, or 0.50 to 0.55.

Preferably, PE3 polymers are copolymer of ethylene one or more polar comonomers. Typically, third ethylene based polymers useful herein include 99.0 to about 80.0 wt %, 99.0 to 85.0 wt %, 99.0 to 87.5 wt %, 95.0 to 90.0 wt %, of polymer units derived from ethylene and about 1.0 to about 20.0 wt %, 1.0 to 15.0 wt %, 1.0 to 12.5 wt %, or 5.0 to 10.0 wt % of polymer units derived from one or more polar comonomers. Suitable polar comonomers include, but are not limited to: vinyl ethers such as vinyl methyl ether, vinyl n-butyl ether, vinyl phenyl ether, vinyl beta-hydroxy-ethyl ether, and vinyl dimethylaminoethyl ether; olefins such as propylene, butene-1, cis-butene-2, trans-butene-2, isobutylene, 3,3,-dimethylbutene-1,4-methylpentene-1, octene-1, and styrene; vinyl type esters such as vinyl acetate, vinyl butyrate, vinyl pivalate, and vinylene carbonate; haloolefins such as vinyl fluoride, vinylidene fluoride, tetrafluoroethylene, vinyl chloride, vinylidene chloride, tetrachloroethylene, and chlorotrifluoroethylene; acrylic-type esters such as methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3,-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, beta-hydroxethyl methacrylate, beta-hydroxpropyl methacrylate, 3-hydroxy-4-carbo-methoxy-phenyl methacrylate, N,N-dimethylaminoethyl methacrylate, t-butylaminoethyl methacrylate, 2-(1-aziridinyl)ethyl methacrylate, diethyl fumarate, diethyl maleate, and methyl crotonate; other acrylic-type derivatives such as acrylic acid, methacrylic acid, crotonic acid, maleic acid, methyl hydroxy, maleate, itaconic acid, acrylonitrile, fumaronitrile, N,N-dimethylacrylamide, N-isopropylacrylamide, N-t-butylacrylamide, N-phenylacrylamide, diacetone acrylamide, methacrylamide, N-phenylmethacrylamide, N-ethylmaleimide, and maleic anhydride; and other compounds such as allyl alcohol, vinyltrimethylsilane, vinyltriethoxysilane, N-vinylcarbazole, N-vinyl-N-methylacetamide, vinyldibutylphosphine oxide, vinyldiphenylphosphine oxide, bis-(2-chloroethyl) vinylphosphonate, and vinyl methyl sulfide.

Preferably, PE3-type polyethylenes are an ethylene/vinyl acetate copolymer having about 2.0 wt % to about 15.0 wt %, typically about 5.0 wt % to about 10.0 wt %, polymer units derived from vinyl acetate, based on the amounts of polymer units derived from ethylene and vinyl acetate. In certain embodiments, the EVA resin can further include polymer units derived from one or more comonomer units selected from propylene, butene, 1-hexene, 1-octene, and/or one or more dienes. Suitable dienes include, for example, 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), and combinations thereof.

PE3-type polyethylenes may have a melt index ("MI"), as measured according to ASTM D1238, 2.16 kg, 190° C., of 0.05 to 12.0 g/10 min., particularly 0.1 to 2.5 g/10 min., 0.2 to 1.0, or 0.3 to 0.7 g/10 min.

In some embodiments, the PE3-type polyethylenes has a melting point of 40° C. or less, as measured by industry acceptable thermal methods, such as Differential Scanning calorimetry (DSC). In other embodiments, the melting point can may be 40.0° C. to about 90.0° C.; 40.0° C. to 80.0° C.; 50.0° C. to 70.0° C.; 55.0° C. to 65.0° C.; or about 60.0° C.

PE3-type polyethylenes may have a Vicat softening point of about 20.0° C. to about 80.0° C., as measured by ASTM D1525. The Vicat softening point can also range from a low of about 20° C., 25.0° C., or 30.0° C. to a high of about 35.0° C., 40.0° C., or 50.0° C. The Vicat softening point of the HPPE resin can also be 20.0° C. to 70.0° C.; 30.0° C. to 60.0° C.; 35.0° C. to 45.0° C.; about 35.0° C., or 40.0° C.

In some embodiments, the PE3-type polyethylenes include 0.1 wt % to 10.0 wt % units derived from one or more modifiers, based on the total weight of the resin. The amount of the modifier(s) can range from a low of about 0.1 wt %, 0.3 wt %, or 0.8 wt % to a high of about 3.0 wt %, 6.0 wt %, or 10.0 wt %, based on the total weight of the resin. The amount of the modifier(s) can also range from a low of about 0.2 wt %, 0.4 wt %, or 0.8 wt % to a high of about 1.5 wt %, 2.5 wt %, 3.6 wt %, or 5 wt %, based on the total weight of the resin. The amount of the modifier can also be 0.1 wt % to 8 wt %; 0.2 wt % to 6 wt %; 0.3 wt % to 6 wt %; 0.3 wt % to 4 wt %; 0.4 wt % to 4.0 wt %; 0.6 wt % to 4 wt %; 0.4 wt % to 3.5 wt %; or 0.5 wt % to 3.8 wt %, based on the total weight of the resin.

Suitable modifiers, also called chain transfer agents, can include, but are not limited to, tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-butene-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetonitrile, N-ethylacetamide, propylene, 1-butene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2,1-bromo-2-chlorethane, octene-1,2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1,1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, proprionaldehyde, and phosphine. Further details and other suitable transfer agents are described in Advances in Polymer Science, Vol. 7, pp. 386-448 (1970).

The $C_2$ to $C_{12}$ unsaturated modifiers contain at least one unsaturation, but they can also contain multiple conjugated or non-conjugated unsaturations. In case of multiple unsaturations, it is preferred that they are non-conjugated. In certain embodiments, the unsaturation of the $C_2$ to $C_{12}$ unsaturated modifier can be di-substituted with one or more alkyl groups in the beta position. Preferred $C_2$ to $C_{12}$ unsaturated modifiers include propylene, isobutylene, or a combination thereof.

PE3-type polyethylenes can also contain one or more antioxidants. Phenolic antioxidants are preferred, such as butylated hydroxytoluene (BHT) or other derivatives containing butylated hydroxytoluene units such as Irganox 1076 or Irganox 1010 and alike. The antioxidant can be present in an amount less than 0.05 wt %, based on the total weight of the resin. When present, for example, the amount of the one or more antioxidants can range from a low of about 0.001 wt %, 0.005 wt %, 0.01 wt %, or 0.015 wt % to a high of about 0.02 wt %, 0.03 wt %, 0.04 wt %, or 0.05 wt %.

PE3-type polyethylenes can further contain one or more additives. Suitable additives can include, but are not limited to: stabilization agents such as antioxidants or other heat or light stabilizers; anti-static agents; crosslink agents or co-agents; crosslink promotors; release agents; adhesion promotors; plasticizers; or any other additive and derivatives known in the art. Suitable additives can further include one or more anti-agglomeration agents, such as oleamide, stearamide, erucamide or other derivatives with the same activity as known to the person skilled in the art. Preferably, the HPPE resin contains less than 0.15 wt % of such additives, based on the total weight of the resin. When present, the amount of the additives can also range from a low of about 0.01 wt %, 0.02 wt %, 0.03 wt %, or 0.05 wt % to a high of about 0.06 wt %, 0.08 wt %, 0.11 wt %, or 0.15 wt %.

PE3-type polyethylenes are available from ExxonMobil Chemical Company as ExxonMobil™ LDPE or Nexxstar™ resins.

Propylene-Based Elastomer

As used herein term "propylene-based elastomer" means a polymer having a melt flow rate in the range of 0.5 to 50 dg/min., a heat of fusion of less than 75 J/g and comprising 65 to 95 wt % of polymer units derived from propylene and 3 to 35 wt % of polymer units derived from ethylene, a $C_4$ to $C_{20}$ alpha-olefin comonomer, or mixtures thereof, based upon total weight of the propylene-based elastomer.

The alpha-olefin comonomer may be linear or branched, and two or more comonomers may be used, if desired. Examples of suitable alpha-olefin comonomers include butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene.

In some embodiments the propylene-based elastomers may further comprise one or more diene-derived units. The propylene-based elastomers may have a comonomer content (i.e., ethylene and/or $C_4$ to $C_{10}$ alpha-olefin content) in the range of from 3 to 35 wt %, based on the weight of the propylene-based elastomer. In general, the comonomer content is adjusted so that the propylene-based elastomer has a heat of fusion ("Hf") of less than or equal to 75 J/g and a melt flow rate ("MFR") in the range of 0.5 to 50 dg/min. In some embodiments, the propylene-based elastomer has an isotactic triad fraction in the range of about 65% to about 99%.

The propylene-based elastomer may incorporate propylene-derived units having crystalline regions interrupted by non-crystalline regions. The non-crystalline regions may result from regions of non-crystallizable polypropylene segments and/or the inclusion of comonomer units. The crystallinity and the melting point of the propylene-based elastomer may be reduced as compared to highly isotactic polypropylene by the introduction of errors in the insertion of propylene and/or by the presence of comonomer.

In some embodiments, the crystallinity of the propylene-based elastomer is reduced by the copolymerization of propylene with limited amounts of one or more comonomers selected from: ethylene, $C_4$ to $C_{20}$ alpha-olefins, and optionally dienes. Preferred comonomers are ethylene, 1-butene, 1-hexane, and/or 1-octene. The propylene-based elastomer may comprise comonomer-derived units in an amount in the range of 5 to 35 wt %, or in the range of 5 to 28 wt %, or in the range of 5 to 25 wt %, or in the range of 5 to 20 wt %, or in the range of 5 to 16 wt %, or in the range of 6 to 18 wt %, or in some embodiments in the range of 7 to 20 wt % comonomer-derived units, based on the weight of the propylene-based elastomer. The comonomer content of the propylene-based elastomer may be determined by ASTM D3900.

In one embodiment, the propylene-based elastomer comprises at least 65 wt %, or at least 75 wt %, or at least 89 wt %, of propylene-derived units, based on the weight of the propylene-based elastomer. In another embodiment, the propylene-based elastomer comprises from 65 wt % to 95 wt %, or from 75 wt % to 95 wt %, or from 89 wt % to 93 wt %, or from 80 wt % to 90 wt %, of propylene-derived units, based on the weight of the propylene-based elastomer.

In some embodiments, when more than one comonomer is present, the amount of a particular comonomer may be less than 5 wt %, but the combined comonomer content is preferably greater than 5 wt %. When there is more than one comonomer unit in the copolymer, the total weight percent of the ethylene and/or $C_4$ to $C_{10}$ alpha-olefin derived units may be in the range of 5 to 35 wt %, or in the range of 7 to 32 wt %, or in the range of 8 to 25 wt %, or preferably in the range of 8 to 20 wt %, or more preferably in the range of 8 to 18 wt %. Particular embodiments of copolymers having more than one comonomer units include propylene-ethylene-octene, propylene-ethylene-hexene, and propylene-ethylene-butene polymers. These copolymers may further comprise a diene.

In some embodiments, the propylene-based elastomer consists essentially of units derived from propylene and ethylene. The propylene-based elastomer may comprise 5 to 35 wt % of ethylene-derived units, or 5 to 30 wt %, or 5 to 25 wt %, or 5 to 20 wt % of ethylene-derived units, based on the total weight of the propylene-based elastomer. In one embodiment, the propylene-based elastomer comprises 10 to 12 wt % of ethylene-derived units, based on the total weight of the propylene-based elastomer. In another embodiment, the propylene-based elastomer comprises 15 to 20 wt % of ethylene-derived units, based on the total weight of the propylene-based elastomer. In other embodiments, the propylene-based elastomer may comprise 5 to 16 wt % of ethylene-derived units.

The propylene-based elastomer may optionally comprise less than or equal to 12 wt % diene-derived units (or "diene"), or less than or equal to 10 wt % diene, or less than or equal to 5 wt % diene, or preferably less than or equal to 3 wt % diene. In some embodiments the diene is present in the range of 0.1 to 9 wt %, or in the range of 0.1 to 6 wt %, or in the range of 0.1 to 5 wt %, or in the range of 0.1 to 4 wt %, or in the range of 0.1 to 2 wt %, or in the range of 0.1 to 1 wt %. In other embodiments, the propylene-based elastomer may comprise the diene in amount in the range of from about 2.0 wt % to about 7.0 wt %, or in the range of about 3.0 wt % to about 5.0 wt %, based on the total weight of the propylene-based elastomer. The optional diene units may be derived from any hydrocarbon structure having at least two unsaturated bonds wherein at least one of the unsaturated bonds may be incorporated into a polymer. Suitable dienes include, but are not limited to: straight chain acyclic olefins such as 1,4-hexadiene and 1,6-octadiene; branched chain acyclic olefins such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins such as tetrahydroindene, methyl-tetrahydroindene, dicyclopentadiene ("DCPD"), ethylidiene norbornene ("ENB"), norbornadiene, alkenyl norbornenes, alkylidene norbornenes, cycloalkelnyl norobornenes, and cycloalkylinene norbornenes (such as 5-vinyl-2-norbornene); cycloalkenyl-substituted alkenes, such as vinyl cyclohexene, allyl cyclohexene, vinyl cyclooctene, 4-vinyl cyclohexene, alkyl cyclodecene, vinyl cyclododecene, divinyl benzene, and tetracyclo (A-11,12)-5,8-dodecene; and combinations thereof. In certain embodiments, the diene is 5-ethylidene-2-norbornene, 5-vinyl-2-norbornene, or divinyl benzene. The diene, if present, is preferably ENB.

The propylene-based elastomer may have a melt flow rate ("MFR", ASTM D1238, 2.16 kg, 230° C.), greater than or equal to 0.2 dg/min., or greater than or equal to 0.5 dg/min. In some embodiments the propylene-based elastomer's MFR is in the range of 0.5 to 50 dg/min., or in the range of 1 to 40 dg/min., or in the range of 2 to 35 dg/min., or in the range of 2 to 30 dg/min. In other embodiments, the propylene-based elastomer's MFR is in the range of 0.5 to 50 dg/min., or in the range of 2 to 10 dg/min., or in the range of 2 to 8 dg/min., or in the range of 3 to 5 dg/min.

In one embodiment, the propylene-based elastomer has a heat of fusion ("Hf"), as determined by the Differential Scanning calorimetry ("DSC") procedure described herein, of greater than or equal to 0.5 J/g, or 1 J/g, or 5 J/g, and is less than or equal to 75 J/g, or preferably less than or equal to 70 J/g, or 50 J/g, or less than or equal to 35 J/g. Stated another way, in one or more embodiments, the Hf value may be within the range of 1.0, or 1.5, or 3.0, or 4.0, or 6.0, or 7.0 J/g to 30, or 35, or 40, or 50, or 60, or 70, or 75 J/g.

The propylene-based elastomer may have a percent crystallinity within the range of 0.5 to 40%, or in the range of 1 to 30%, or preferably in the range of 5 to 35%, wherein "percent crystallinity" is determined according to the DSC procedure described herein. The thermal energy for the highest order of propylene is estimated at 189 J/g (i.e., 100% crystallinity is equal to 189 J/g). In some embodiments, the propylene-based elastomer has a crystallinity less than 40%, or in the range of 0.25 to 25%, or in the range of 0.5 to 22%.

The procedure for DSC determinations is as follows. About 0.5 grams of polymer is weighed and pressed to a thickness of about 15 to 20 mils (about 381-508 microns) at about 140-150° C., using a "DSC mold" and MYLAR™ film as a backing sheet. The pressed polymer sample is allowed to cool to ambient temperatures by hanging in air (the MYLAR™ film backing sheet is not removed). The pressed polymer sample is then annealed at room temperature (about 23-25° C.). A 15-20 mg disc is removed from the pressed polymer sample using a punch die and is placed in a 10 microliter aluminum sample pan. The disc sample is then placed in a DSC (Perkin Elmer Pyris 1 Thermal Analysis System) and is cooled to about −100° C. The sample is heated at about 10° C./min to attain a final temperature of about 165° C. The thermal output, recorded as the area under the melting peak of the disc sample, is a measure of the heat of fusion and can be expressed in Joules per gram (J/g) of polymer and is automatically calculated by the Perkin Elmer system. Under these conditions, the melting profile shows two (2) maxims, the maxima at the highest temperature is taken as the melting point within the range of melting of the disc sample relative to a baseline measurement for the increasing heat capacity of the polymer as a function of temperature.

The propylene-based elastomer may have a single peak melting transition as determined by DSC. In one embodiment, the propylene-based elastomer has a primary peak transition of less than about 90° C., with a broad end-of-melt transition of greater than about 110° C. The peak "melting point" ("Tm") is defined as the temperature of the greatest heat absorption within the range of melting of the sample. However, the copolymer may show secondary melting peaks adjacent to the principal peak, and/or at the end-of-melt transition, however for the purposes herein, such secondary melting peaks are considered together as a single melting point, with the highest of these peaks being considered the Tm of the propylene-based elastomer. The propylene-based elastomer may have a Tm of less than or equal to 115° C., or less than or equal to 100° C., or less than or equal to 90° C., or less than or equal to 80° C., or less than or equal to 70° C., or in one embodiment in the range of 25 to 100° C., or in the range of 25 to 85° C., or in the range of 25 to 75° C., or in the range of 25 to 65° C., or in the range of 30 to 80° C., or in the range of 30 to 70° C.

The propylene-based elastomer may have a weight average molecular weight ("Mw") in the range of 5,000 to 5,000,000 g/mole, or preferably in the range of 10,000 to 1,000,000 g/mole, or more preferably in the range of 50,000 to 400,000 g/mole. In some embodiments the propylene-based elastomer has a Mw greater than 10,000, or greater than 15,000, or greater than 20,000, or greater than 80,000 g/mole and less than 5,000,000, or less than 1,000,000, or less than 500,000 g/mole.

The propylene-based elastomer may have a number average molecular weight ("Mn") in the range of 2,500 to 2,500,00 g/mole, or preferably in the range of 10,000 to 250,000 g/mole, or more preferably in the range of 25,000 to 200,000 g/mole. The propylene-based elastomer may have a Mz within the range of 10,000 to 7,000,000 g/mole, or preferably in the range of 80,000 to 700,000 g/mole, or more preferably in the range of 100,000 to 500,000 g/mole.

The propylene-based elastomer may have a molecular weight distribution ("MWD") (Mw/Mn) within the range of 1.5 to 20, or in the range of 1.5 to 15, or in the range of 1.5 to 5, or preferably in the range of 1.8 to 5, or more preferably in the range of 1.8 to 3 or 4. In some embodiments the propylene-based elastomer's MWD is in the range of 1.5 or 1.8 or 2.0 to 4.5 or 5 or 10 or 20 or 40.

Techniques for determining the molecular weight (Mn, Mw, and Mz) and MWD of propylene-based elastomers are as follows, and as in Verstate et al, in 21 MACROMOLECULES 3360 (1988). Conditions described herein govern over published test conditions. Molecular weight and MWD are measured using a Waters 150 gel permeation chromatograph equipped with a Chromatix KMX-6 on-line light scattering photometer. The system is used at 135° C. with 1,2,4-trichlorobenze as the mobile phase. Showdex (Showa-Denko America, Inc.) polystyrene gel columns 802, 803, 804, and 805 are used. This technique is discussed in LIQUID CHROMATOGRAPHY OF POLYMERS AND RELATED MATERIALS III 207 (J. Cazes ed., Marcel Dekker, 1981). No corrections for column spreading were employed; however, data on generally acceptable standards, e.g. National Bureau of Standards Polyethylene 1484 and anionically produced hydrogenated polyisoprenes (an alternating ethylene propylene copolymer) demonstrate that such corrections on Mw/Mn or Mz/Mw are less than 0.05 units. Mw/Mn was calculated from an elution time-molecular relationship whereas Mz/Mw was evaluated using the light scattering photometer. The numerical analysis can be performed using the commercially available computer software GPC2, MOLWT2 available from LDC/Milton Roy-Rivera Beach, Fla.

Preferred propylene-based elastomers may have a propylene tacticity index (m/r) ranging from a lower limit of 4 or 6 to an upper limit of about 8, 10, or 12. The propylene tacticity index, expressed herein as "m/r", is determined by $^{13}$C nuclear magnetic resonance (NMR). The propylene tacticity index m/r is calculated as defined in H. N. Cheng, Macromolecules, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, an m/r ratio of 1.0 an atactic material and an m/r ratio of greater than 1.0 an isotactic material. Isotactic materials theoretically have a ratio approaching infinity, and many by-product atactic polymers have sufficient isotactic content to result in ratios of greater than 50.

The propylene-based elastomer may have an isotactic triad tacticity of three propylene units, as measured by $^{13}$C NMR, of 75% or more, or 80% or more, or 82% or more, or 85% or more, or in some embodiments 90% or more. Preferably, the triad tacticity is in the range of 50 to 99%, or in the range of 60 to 99%, or more preferably in the range of 75 to 99%, or in the range of 80 to 99%, or in the range of 70 to 98%, or in other embodiments in the range of 60 to 97%. As used herein, isotactic triad tacticity is defined to be an mm triad tacticity of three propylene units, as measured by $^{13}$C NMR. The triad tacticity can be determined from a $^{13}$C NMR spectrum of the polymer as described below and as described in U.S. Pat. No. 5,504,172, herein incorporated by reference. The mm triad tacticity of a polymer is the relative tacticity of a sequence of three adjacent propylene units, a chain consisting of head to tail bonds, expressed as a binary combination of m and r sequences. It is usually expressed for the propylene-based elastomers as the ratio of the number of units of the specified tacticity to all of the propylene triads in the copolymer. The mm triad tacticity (mm fraction) of a propylene copolymer can be determined from a $^{13}$C NMR spectrum of the propylene copolymer and the following formula:

$$\text{mm Fraction} = \frac{\text{PPP(mm)}}{\text{PPP(mm)} + \text{PPP(mr)} + \text{PPP(rr)}}$$

where PPP(mm), PPP(mr) and PPP(rr) denote peak areas derived from the methyl groups of the second units in the following three propylene unit chains consisting of head-to-tail bonds:

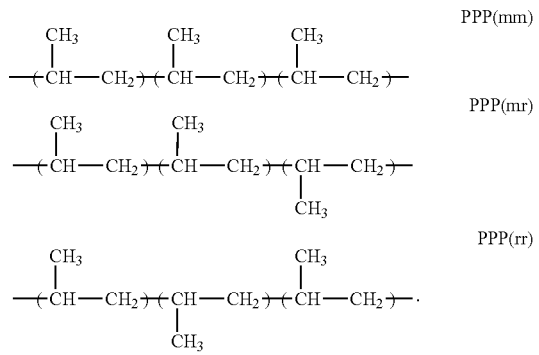

The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal *Polymer*, Volume 30 (1989), p. 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The propylene-based elastomer may have a density within the range of 0.850 to 0.920 g/cm$^3$, or in the range of 0.860 to 0.900 g/cm$^3$, or preferably in the range of 0.860 to 0.890 g/cm$^3$ at room temperature as measured per the ASTM D-1505 test method.

The propylene-based elastomer may possess an Elongation at Break (ASTM D-412 at 23° C.) of less than 2000%, or less than 1000%, or less than 900%.

In one embodiment, the propylene-based elastomer has a Shore A hardness (ASTM D-2240 at 23° C.) of less than about 90. In another embodiment, the propylene-based elastomer has a Shore A hardness of in the range of about 45 to about 90, or in the range of about 55 to about 80.

The propylene-based elastomers described herein are not limited by any particular polymerization method for preparing the propylene-based elastomer. The propylene-based elastomers can include copolymers prepared according to the procedures in WO 00/01745, WO 02/36651, U.S. Pat. Nos. 6,992,158, 6,881,800, and 7,232,871, all of which are herein incorporated by reference. Examples of commercially available propylene-based elastomers include resins sold under the trade names VISTAMAXX™ (ExxonMobil Chemical Company, Houston, Tex., USA) and VERSIFY™ (The Dow Chemical Company, Midland, Mich., USA).

In one embodiment the propylene-based elastomer comprises 80 to 90 wt % propylene-derived units and 10 to 20 wt % of ethylene-derived units. The propylene-based elastomer has a density in the range of 0.855 to 0.870 g/cm$^3$ and an MFR in the range of 2 to 4 dg/min. The propylene-based elastomer may have a Shore A hardness in the range of 60 to 70. The propylene-based elastomer may have a percent crystallinity in the range of 3 to 10%.

In another embodiment the propylene-based elastomer comprises 85 to 95 wt % propylene-derived units and 5 to 15 wt % ethylene-derived units. The propylene-based elastomer has a density in the range of 0.865 to 0.880 g/cm$^3$ and an MFR in the range of 2 to 4 dg/min. The propylene-based elastomer may have a Shore A hardness in the range of 80 to 95. The propylene-based elastomer may have a percent crystallinity in the range of 5 to 15%.

First and Second Outer Layer Composition

The films described herein include polyethylene-containing first and second outer layers, independently preferably comprising: 1) from 80.0 to 100.0 wt % of a at least a first PE1 polymer having a composition distribution breadth index (CDBI) of 60% or more a density of 0.910 to 0.925 g/cm³, and a melt index of 0.05 to 5.0 g/10 min. The lower limit on the amount of the first PE1 in the first outer layer may be 82.5, 85.0, 87.5, 90.0, 95.0, 97.5, or 99.0 wt %. The upper limit on the amount of the first PE1 in the first outer layer may be 82.5, 85.0, 87.5, 90.0, 95.0, 97.5, or 99.0 wt %. Embodiments combining any lower limit and upper limit are envisioned. Particular embodiments include from 90.0 to 99.0 wt % of a first PE1. In particular embodiments, the first outer layer includes 90.0 to 99.0 wt % of a first PE1, particularly where the first PE1 has a melt index of 0.7 to 1.2 and a density of about 0.915 to 0.925 g/cm³.

The second outer layer also includes a PE1-type polyethylene, which may be the same or different than the PE1 in the first outer layer. The lower limit on the amount of the PE1 in the second outer layer may be 82.5, 85.0, 87.5, 90.0, 95.0, 97.5, or 99.0 wt %. The upper limit on the amount of the PE1 in the second outer layer may be 82.5, 85.0, 87.5, 90.0, 95.0, 97.5 or 99.0 wt %. Embodiments combining any lower limit and upper limit are envisioned. In particular embodiments, the second outer layer includes 90.0 to 99.0 wt % of a PE1, particularly where the PE1 has a melt index of 0.7 to 1.2 and a density of about 0.915 to 0.925 g/cm³.

Inner Layer Composition

The multilayer films described herein have an inner layer positioned between the first and second outer layers. Generally, the inner layer comprises 30.0 to 50.0 wt % of a propylene-based elastomer or a PE3-type polyethylene, i.e., a polyethylene having a $g'_{vis}$ of 0.50 to 0.85.

In particular embodiments, the inner layer comprises: 1) from 50.0 to 70.0 wt %, particularly 55.0 to 65.0 wt (based on the total weight of inner intermediate layer) of a PE2-type polyethylene. The lower limit on the amount of the PE2-type polyethylene in the inner layer may be 55.0, 57.5, 60.0, 65.0, 67.5, or 70.0 wt %. The upper limit on the amount of the PE2-type polyethylene in the inner layer may be 55.0, 57.5, 60.0, 65.0, 67.5, or 70.0 wt %. Embodiments combining any lower limit and upper limit are envisioned.

Particular PE2-type polyethylenes in the inner layer have a CDBI of at least 70%, a melt index, $I_{2.16}$, of about 0.1 to about 2.0 g/10 min., particularly 0.1 to 1.0 g/10 min., 0.3 to 0.7 g/10 min., or 0.4 to 0.6 g/10 min., a density of from about 0.910 to about 0.940 g/cm³, particularly 0.910 to about 0.930 g/cm³, preferably having a $M_w/M_n$ of about 2.5 to about 5.5. In particular embodiments, the first PE2 has a density of 0.917 to 0.923 g/cm³ and a melt index 12.16 (2.16 kg/190 C.) of 0.3 to 0.7.

In some embodiments, the inner layer also includes 30.0 to 50.0 wt %, preferably 32.5 to 47.5 wt %, or 35.0 to 45.0 wt %, of a propylene-based elastomer preferably comprising 65 to 96 wt %, particularly 13.0 to 17.0 wt %, 14.0 to 17.0 wt %, or 15.0 to 17.0 wt % propylene-derived units, based upon the total weight of the propylene-based elastomer and 4 to 35 wt %, particularly 87.0 to 83.0 wt %, 86.0 to 83.0 wt %, or 85.0 to 83.0 wt % polymer units derived from ethylene or a $C_4$ to $C_{20}$ alpha-olefin, particularly ethylene, based upon the total weight of the propylene-based elastomer. The propylene-based polymer may preferably have melt flow rate (230° C./2.16 kg) of 1.0 to 5.0 g/min., preferably 2.5 to 3.5 g/10 min. The propylene-based polymer may also preferably have a melt index (190° C./2.16 kg) of 0.5 to 3.0 g/min., preferably 1.0 to 2.0 g/10 min., or 1.0 to 1.5 g/10 min. In particular embodiments the propylene-based elastomer in the inner layer has an ethylene content of about 14.0 to about 18.0, particularly about 16%, a mass flow rate of about 1.0 to about 5.0 g/10 min (230° C./2.16 kg), a melt index (190° C./2.16 kg) of 1.0 to 2.0 g/10 min., particularly 1.1 to 1.5 g/10 min., and a density of 0.855 to 0.870 g/cm³, particularly 0.860 to 0.865 g/cm³.

In other embodiments, the inner layer comprises a PE2-type polyethylene and 30.0 to 50.0 wt %, particularly 32.5 to 37.5 wt %, or 35.0 to 45.0 wt %, of a PE3-type polyethylene, particularly an ethylene/vinyl acetate copolymer comprising 5.0 to about 15.0 wt % polymer units derived from vinyl acetate.

First Intermediate Layer Composition

The films described herein generally have a first intermediate layer interposing the first outer layer and the inner layer. The first intermediate layer comprising: 1) from 70.0 to 90.0 wt % (based on the total weight of the first intermediate layer) of a PE2-type polyethylene. The lower limit on the amount of the PE2-type in the first intermediate layer may be 70.0, 72.5, 75.0, 77.5, 80.0, 82.5, 85.0, 87.5, or 90.0 wt %. The upper limit on the amount of the PE2-type polyethylene in the first intermediate layer may be 72.5, 75.0, 77.5, 80.0, 82.5, 85.0, 87.5, or 90.0. Embodiments combining any lower limit and upper limit are envisioned. In particular embodiments, the first intermediate layer includes 75.0 to 85.0 wt % of the PE2-type polyethylene.

Particular PE2-type polyethylenes in the first intermediate layer have a CDBI of at least 70%, a melt index, $I_{2.16}$, of about 0.1 to about 2.0 g/10 min., particularly 0.1 to 1.0 g/10 min., 0.3 to 0.7 g/10 min., or 0.4 to 0.6 g/10 min., a density of from about 0.910 to about 0.940 g/cm³, particularly 0.910 to about 0.930 g/cm³, preferably having a $M_w/M_n$ of about 2.5 to about 5.5. In particular embodiments, the first PE2 has a density of 0.917 to 0.923 g/cm³ and a melt index 12.16 (2.16 kg/190 C.) of 0.3 to 0.7 g/min.

In particular embodiments, the first intermediate layer includes 75.0 to 85.0 wt % of a PE2-type polyethylene having a melt index of 0.3 to 0.7 and a density of about 0.915 to 0.925 g/cm³.

The first intermediate layer generally includes 10.0 to 30.0 wt % of a propylene-based elastomer. The lower limit on the amount of propylene-based elastomer in the first intermediate layer may be 12.5, 15.0, 17.5, 20.0, 22.5, 25.0, 27.5, or 30.0 wt %. The upper limit on the amount of propylene-based elastomer in the first intermediate layer may be 12.5, 15.0, 17.5, 20.0, 22.5, 25.0, 27.5, or 30.0 wt %.

The propylene based elastomer in the first intermediate layer preferably comprises 65 to 96 wt %, particularly 5.0 to 15.0 wt %, 6.0 to 14.0 wt %, 7.0 to 13.0 wt %, or 8.0 to 12.0 wt % propylene-derived units, based upon the total weight of the propylene-based elastomer and 4 to 35 wt %, particularly 95.0 to 85.0 wt %, 94.0 to 86.0 wt %, or 93.0 to 87.0 wt %, or 92.0 to 88.0 wt %, polymer units derived from ethylene or a $C_4$ to $C_{20}$ alpha-olefin, particularly ethylene, based upon the total weight of the propylene-based elastomer. The propylene-based polymer in the first inner layer may preferably have melt flow rate (230° C./2.16 kg) of 1.0 to 5.0 g/min., preferably 1.0 to 3.0 g/10 min., or 1.7 to 2.5 g/min., or 2.1 to 2.3. The propylene-based polymer may also preferably have a melt index (190° C./2.16 kg) of 0.1 to 3.0 g/min., preferably 0.5 to 2.0 g/10 min., or 0.7 to 1.0 g/10 min. In particular embodiments the propylene-based elastomer in the inner layer has an ethylene content of 8.0 to 12.0, a mass flow rate of 1.7 to 2.5 g/min., or 2.1 to 2.3 (230° C./2.16 kg), a melt index (190° C./2.16 kg) of 0.7 to 1.0 g/10 min., and a density of 0.855 to 0.885 g/cm³, particularly 0.865 to 0.880 g/cm³.

Second Intermediate Layer Composition

The films described herein generally have a second intermediate layer interposing the second outer layer and the inner layer. The second layer composition may be the same or different from the first intermediate layer composition, although for convenience in manufacturing the layers may be formed form a common source of the composition.

The films described herein generally have a second intermediate layer interposing the second outer layer and the inner layer. The second intermediate layer comprising: 1) from 70.0 to 90.0 wt % (based on the total weight of the first intermediate layer) of a PE2-type polyethylene. The lower limit on the amount of the PE2-type in the second intermediate layer may be 70.0, 72.5, 75.0, 77.5, 80.0, 82.5, 85.0, 87.5, or 90.0 wt %. The upper limit on the amount of the PE2-type polyethylene in the second intermediate layer may be 72.5, 75.0, 77.5, 80.0, 82.5, 85.0, 87.5, or 90.0. Embodiments combining any lower limit and upper limit are envisioned. In particular embodiments, the second intermediate layer includes 75.0 to 85.0 wt % of the PE2-type polyethylene.

Particular PE2-type polyethylenes in the second intermediate layer have a CDBI of at least 70%, a melt index, $I_{2.16}$, of about 0.1 to about 2.0 g/10 min., particularly 0.1 to 1.0 g/10 min., 0.3 to 0.7 g/10 min., or 0.4 to 0.6 g/10 min., a density of from about 0.910 to about 0.940 g/cm$^3$, particularly 0.910 to about 0.930 g/cm$^3$, preferably having a $M_w/M_n$ of about 2.5 to about 5.5. In particular embodiments the first PE2 has a density of 0.917 to 0.923 g/cm$^3$ and a melt index $I_{2.16}$ (2.16 kg/190 C.) of 0.3 to 0.7. g/min.

In particular embodiments, the second intermediate layer includes 75.0 to 85.0 wt % of a PE2-type polyethylene having a melt index of 0.3 to 0.7 and a density of about 0.915 to 0.925 g/cm$^3$.

The second intermediate layer generally includes 10.0 to 30.0 wt % of a propylene-based elastomer. The lower limit on the amount of propylene-based elastomer in the second intermediate layer may be 12.5, 15.0, 17.5, 20.0, 22.5, 25.0, 27.5, or 30.0 wt %. The upper limit on the amount of propylene-based elastomer in the second intermediate layer may be 12.5, 15.0, 17.5, 20.0, 22.5, 25.0, 27.5, or 30.0 wt %.

The propylene based elastomer in the second intermediate layer preferably comprises 65 to 96 wt %, particularly 5.0 to 15.0 wt %, 6.0 to 14.0 wt %, 7.0 to 13.0 wt %, or 8.0 to 12.0 wt % propylene-derived units, based upon the total weight of the propylene-based elastomer and 4 to 35 wt %, particularly 95.0 to 85.0 wt %, 94.0 to 86.0 wt %, or 93.0 to 87.0 wt %, or 92.0 to 88.0 wt %, polymer units derived from ethylene or a $C_4$ to $C_{20}$ alpha-olefin, particularly ethylene, based upon the total weight of the propylene-based elastomer. The propylene-based polymer in the first inner layer may preferably have melt flow rate (230° C./2.16 kg) of 1.0 to 5.0 g/min., preferably 1.0 to 3.0 g/10 min., or 1.7 to 2.5 g/min., or 2.1 to 2.3 g/min. The propylene-based polymer may also preferably have a melt index (190° C./2.16 kg) of 0.1 to 3.0 g/min., preferably 0.5 to 2.0 g/10 min., or 0.7 to 1.0 g/10 min. In particular embodiments the propylene-based elastomer in the inner layer has an ethylene content of 8.0 to 12.0, a mass flow rate of 1.7 to 2.5 g/min., or 2.1 to 2.3 (230° C./2.16 kg), a melt index (190° C./2.16 kg) of 0.7 to 1.0 g/10 min., and a density of 0.855 to 0.885 g/cm$^3$, particularly 0.865 to 0.880 g/cm$^3$.

Multilayer films described herein may be formed by any suitable means, e.g., extrusion molding, cast, blown film techniques. When used in multilayer films, the various polymers described herein can be used in any layer of the film unless otherwise indicated. Multilayer films may be made by processes wherein each layer is individually or separately formulated; i.e., the layers formed of or including the polymer composition can have the same or different chemical composition, density, melt index, thickness, etc., depending upon the desired properties of the film.

Films described herein can be used for any purpose, but are particularly suited to stretch hood applications. Some embodiments have uniform stretch as indicated by a positive slope in the stress vs. strain plot. A "positive slope" as used herein means that the stress at each consecutive whole percent of strain is high than the stress value at the previous whole percent of strain. (i.e., the stress value at a strain of 50 is high than the stress value at 49%, which is in turn higher than that at 48, which is higher than that at 47, etc.) Where data points for the whole percentage points are not available, they may be interpolated from the data points at hand. A minimum of 20 data points should be used. Preferably, this behavior is maintained over the range from 0 to 200% strain. The term "positive slope" should not be interpreted to mean the stress vs. strain plot displays a strictly linear or function-based behavior.

Thus, some films described herein have wherein the film has positive slope in the strain-strain curve in the region between 20.0% and 200.0% strain, and a stress value ≥8.5 MPa, particularly from 8.5 to 15 MPa, 8.5 to 13 MPa, 8.5 MPa to 11 MPa, or 8.5 to 10 MPa at strain of 20.0%. In some embodiments, the lower limit on the stress value is 9.0, 10.0, 10.5, 11.0, or 11.5 MPa. Particular films have a stress value ≥9.0 MPa, particularly from 9.0 to 15 MPa, 9.0 to 13 MPa, 9.0 MPa to 11 MPa, or 9.0 to 10 MPa at strain of 20.0%. In some embodiments, the films described herein have a stress value ≥9.5 MPa particularly from 9.5 to 15 MPa, 9.5 to 13 MPa, 9.5 MPa to 11 MPa, or 9.5 to 10 MPa at strain of 100.0%. In some embodiments, the lower limit on the stress value at a strain of 100.0% is 10.0, 10.5, 11.0, or 11.5 MPa. In some embodiments, the upper limit on the stress value at a strain of 100.0% is 10.5, 11.0, 11.5, 12.0, 12.5, or 15 MPa. Any combination of upper and lower limits of the stress value at 100.0% strain are also hereby expressly disclosed. FIG. 1 illustrates the Stress vs. Strain behavior of exemplary and reference films described herein.

Figure 2:
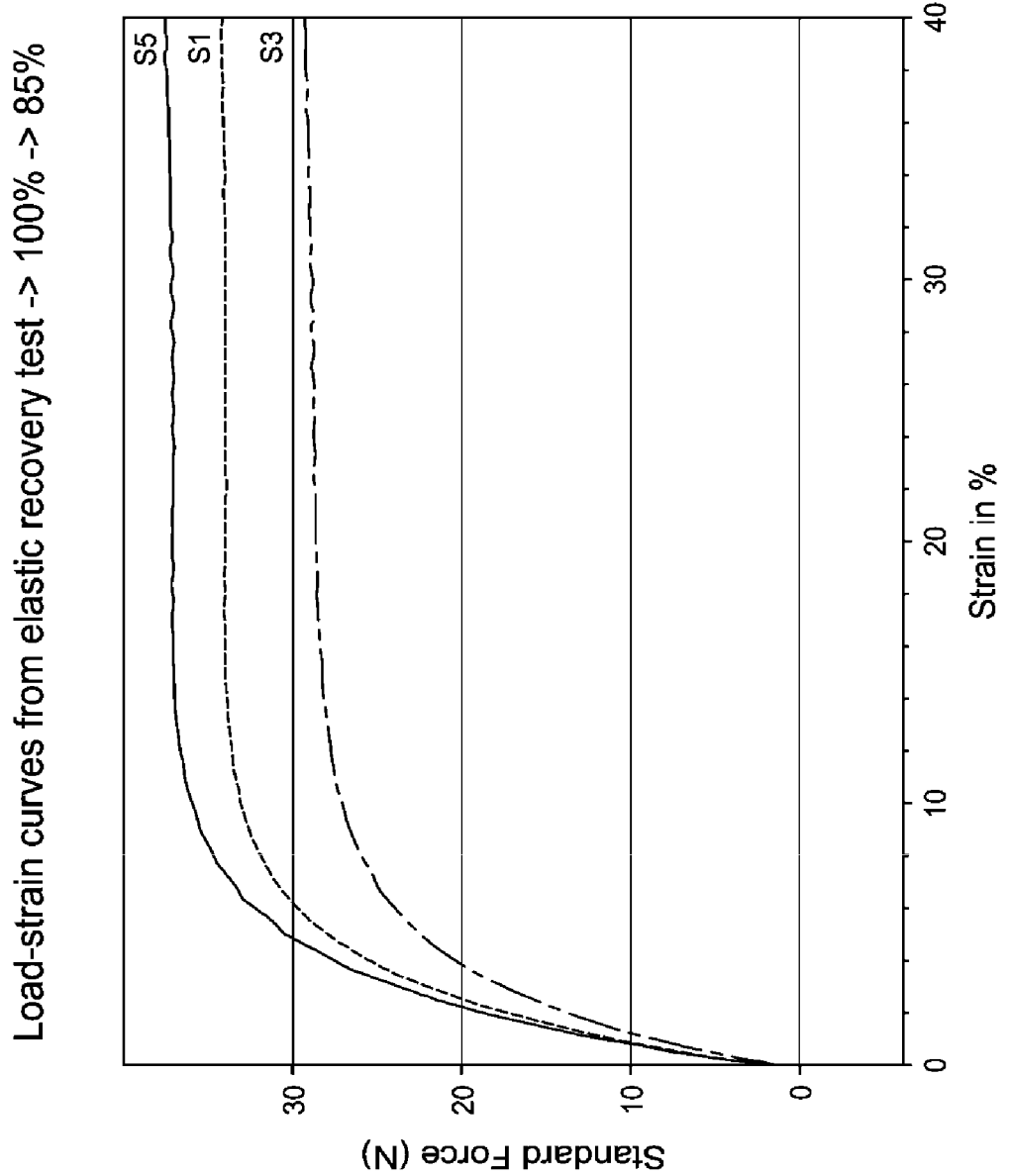
FIG. 2 depicts the elastic recovery for particular films.

Exemplary films also have desirable F(end) values particularly in combination with elastic recovery. Generally, suitable ranges on F(end) and Elastic recovery will be within 5.0%, 10.0% 20.0%, 30.0%, or 40.0% of the upper and lower limits of the values reported. Any combination of such ranges for F(End) and Elastic recovery is hereby expressly disclosed. Load Strain Curves and Elastic recovery behavior for exemplary films are illustrated in FIG. 2.

EXAMPLES

Test Methods

The properties described herein can be determined in accordance with the following test procedures. Where any of these properties is referenced in the appended claims, it is to be measured in accordance with the specified test procedure.

Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

Mw/Mn: The expression $M_w/M_n$ is the ratio of the weight average molecular weight ($M_w$) to the number average molecular weight (MO, also referred to as the molecular weight distribution (MWD). The weight average molecular weight is given by:

$$M_w = \frac{\sum_i n_i M_i^2}{\sum_i n_i M_i}$$

The number average molecular weight is given by:

$$M_n = \frac{\sum_i n_i M_i}{\sum_i n_i}$$

The z-average molecular weight is given by:

$$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, Vol. 34, No. 19, p. 6812 (2001).

Composition Distribution Breadth Index (CDBI): CDBI is generally the weight percent of the ethylene-based polymer having a comonomer content within ±25% of the median comonomer content. The CDBI of a copolymer is readily determined utilizing well known techniques for isolating individual fractions of a sample of the copolymer. One such technique is Temperature Rising Elution Fractionation (TREF), as described in Wild, et al., J. Poly. Sci. Poly. Phys. Ed., vol. 20, p. 441 (1982), which is incorporated herein by reference.

To determine CDBI, a solubility distribution curve is first generated for the copolymer. This may be accomplished using data acquired from TREF techniques described above. This solubility distribution curve is a plot of the weight fraction of the copolymer that is solubilized as a function of temperature. This is converted to a weight fraction versus composition distribution curve. For the purpose of simplifying the correlation of composition with elution temperature the weight fractions less than 15,000 are ignored. These low weight fractions generally represent a trivial portion of the plastomer of the present invention. The remainder of this description and the appended claims maintain this convention of ignoring weight fractions below 15,000 in the CDBI measurements.

From the further details of determining CDBI of a copolymer are known to those skilled in the art, see, for example, PCT Pat. Application No. WO 93/03093, published Feb. 18, 1993.

Melt index is determined according to ASTM D-1238-E (190° C./2.16 kg), also sometimes referred to as $I_{2.16}$. High load melt index is determined according to ASTM D-1238-F (190° C./21.6 kg), also sometimes referred to as $I_{21.6}$. The term melt index ratio refers to the ratio of the high load melt index to the melt index (i.e., $I_{21.6}/I_{2.16}$). "Melt Flow Rate" sometimes also called Melt Mass-Flow Rate or MFR, is also determined according to ASTM D-1238, but at a temperature of 230° C. using a 2.16 kg mass (i.e., 230° C./21.6 kg).

Gauge, reported in µm, is measured using a Measuretech Series 200 instrument. The instrument measures film thickness using a capacitance gauge. For each film sample, ten film thickness datapoints are measured per inch of film as the film is passed through the gauge in a transverse direction. From these measurements, an average gauge measurement is determined and reported.

Elmendorf Tear, reported in grams (g) or grams per µm (g/µm), is measured as specified by ASTM D-1922.

Haze, reported as a percentage (%), is measured as specified by ASTM D-1003.

Dart Drop Impact or Dart Drop Impact Strength (DIS), reported in grams (g) and/or grams per µm (g/µm), is measured as specified by ASTM D-1709, method A.

Peak Puncture Force, reported in pounds (lb) and/or pounds per µm (lb/mil), is determined according to ASTM D-3763.

Shrink, reported as a percentage, is measured by cutting circular specimens from a film using a 100 mm die. The samples were marked in their respective directions, dusted with talc, and placed on a pre-heated, talc covered tile. The samples were then heated using a heat gun (model HG-501A) for approximately 10 to 45 seconds, or until the dimensional change ceased. An average of three specimens is reported. A negative shrinkage number indicates expansion of a dimension after heating when compared to its pre-heating dimension.

Where any of the above properties are reported in pounds per square inch, grams per µm, or in any other dimensions that are reported per unit area or per unit thickness, the ASTM methods cited for each property have been followed except that the film gauge is measured in accordance with ASTM D-374, method C.

Example Films

The exemplary blown films described are prepared and tested. Results of the various tests are reported in the table below. For comparison, a 3-layer film comprising outer layers of Exceed 1018 (a PE1-type polyethylene) and an inner layer comprising Nexxstar 00111 (a PE3-type polyethylene). This comparative film is identified as "SH REF" in the appended Figures.

| | Relative Thickness | Film 1 (S1) | Film 2 (S3) | Film (S5) |
|---|---|---|---|---|
| First outer layer | 1 | 59% Exceed 1018CA + 38.5% Exceed 1018EB + 1.5% AMF 705 + 1% M65 | 59% Exceed 1018CA + 38.5% Exceed 1018EB + 1.5% AMF 705 + 1% M65 | 59% Exceed 1018CA + 38.5% Exceed 1018EB + 1.5% AMF 705 + 1% M65 |
| First intermediate layer | 1 | 80% Enable 20-05CH + 20% Vistamaxx 3020 FL | 80% Enable 20-05CH + 20% Vistamaxx 3020 FL | 80% Enable 20-05CH + 20% Vistamaxx 3020 FL |
| Inner layer | 2.7 | 60% Enable 20-05CH + 40% Vistamaxx 3020 FL | 60% Enable 20-05CH + 40% Vistamaxx 6102 FL | 60% Enable 20-05CH + 40% Nexxstar 00111 |
| Second Intermediate Layer | 1 | 80% Enable 20-05CH + 20% Vistamaxx 3020 FL | 80% Enable 20-05CH + 20% Vistamaxx 3020 FL | 80% Enable 20-05CH + 20% Vistamaxx 3020 FL |
| Second outer layer | 1 | 59% Exceed 1018CA + 39.5% Exceed 1018EB + 1.5% AMF 705 + 1% M65 | 59% Exceed 1018CA + 39.5% Exceed 1018EB + 1.5% AMF 705 + 1% M65 | 59% Exceed 1018CA + 39.5% Exceed 1018EB + 1.5% AMF 705 + 1% M65 |

| | Relative Thickness | Film 1 (S1) | Film 2 (S3) | Film (S5) |
|---|---|---|---|---|
| Film thickness (μm) | | 70 | 70 | 70 |
| Total output (kg/hr) | | 300 | 300 | 300 |
| Thickness profile 2 sigma (%) | | 3.1 | 2.6 | 3.5 |
| Stretch hood test -> 100% -> 85% | | | | |
| Thickness measured (μm) | | 66 | 66 | 67 |
| F max (N) | | 34.0 | 29.7 | 36.5 |
| F end (N) | | 16.3 | 15.5 | 17.9 |
| Stress retention(%) | | 47.8 | 52.0 | 49.2 |
| Elastic recovery (%) | | 47.0 | 52.2 | 47.8 |
| Stretch hood test -> 75% -> 55% | | | | |
| Thickness measured (μm) | | 65 | 67 | 68 |
| F max (N) | | 33.6 | 29.7 | 37.1 |
| F end (N) | | 14.8 | 13.5 | 16.6 |
| Stress retention(%) | | 44.0 | 45.4 | 44.8 |
| Elastic recovery (%) | | 53.1 | 55.4 | 52.2 |
| Stretch hood test -> 65% -> 45% | | | | |
| Thickness measured (μm) | | 66 | 67 | 67 |
| F max (N) | | 34.0 | 30.3 | 36.2 |
| F end (N) | | 14.5 | 13.5 | 15.5 |
| Stress retention(%) | | 42.7 | 44.7 | 42.8 |
| Elastic recovery (%) | | 54.2 | 56.9 | 53.1 |
| Puncture test ASTM D5748 | | | | |
| F max (N) | | 54.6 | 49.9 | 62.8 |
| Travel @ F max (mm) | | 57.9 | 60.3 | 59.9 |
| Energy @ Fmax (J) | | 2.00 | 1.90 | 2.35 |
| F break (N) | | 47.7 | 45.7 | 53.1 |
| Travel @ F break (mm) | | 73.5 | 78.5 | 74.6 |
| Energy @ break (J) | | 2.80 | 2.75 | 3.22 |
| Total Haze (%) | | 13.5 | 17.4 | 16.5 |
| Tensile properties MD | | | | |
| Thickness measured (μm) | | 66 | 66 | 70 |
| 10% offset yield stress (Mpa) | | 9.8 | 8.3 | 10.0 |
| Elong. @ yield (%) | | — | — | — |
| Stress @ yield (Mpa) | | — | — | — |
| Tensile strength @ break | | 49.0 | 42.4 | 48.0 |
| Elong. @ break (%) | | 648 | 622 | 653 |
| Energy @ break (mJ/mm3) | | 128 | 102 | 129 |
| 1% secant modulus (Mpa) | | 190 | 152 | 192 |
| Tensile properties TD | | | | |
| Thickness measured (μm) | | 66 | 67 | 68 |
| 10% offset yield stress (Mpa) | | 9.6 | 8.2 | 9.8 |
| Elong. @ yield (%) | | 8.0 | 9.0 | 9.4 |
| Stress @ yield (Mpa) | | 9.0 | 7.6 | 9.5 |
| Tensile strength @ break | | 44.9 | 40.8 | 43.6 |
| Elong. @ break (%) | | 665 | 656 | 650 |
| Energy @ break (mJ/mm3) | | 115 | 101 | 113 |
| 1% secant modulus (Mpa) | | 199 | 160 | 202 |
| Elmendorf tear strength | | | | |
| MD (gr/μm) | | 10.2 | 11.2 | 11.9 |
| TD (gr/μm) | | 17.0 | 16.7 | 16.4 |

What is claimed is:

1. A multilayer film, comprising:

a. first and second outer layers, wherein the first outer layer comprises from about 82.5 to about 99.0 wt % of a first polyethylene and from about 82.5 to about 99.0 wt % of the second outer layer comprises a second polyethylene, wherein the first and second polyethylenes may be the same or different;

b. an inner layer interposing the first and second outer layers, the inner layer comprising 30.0 to 50.0 wt % of a first propylene-based elastomer or a polyethylene having a $g'_{vis}$ of 0.50 to 0.85;

c. a first polyethylene-containing intermediate layer interposing the first outer layer and the inner layer, the first polyethylene-containing intermediate layer comprising:

10.0 to 30.0 wt % of a second propylene-based elastomer, wherein the second propylene-based elastomer has a melt flow rate (230° C./2.16 kg) of 2.0 to 3.0 g/10 min and 5.0 to 15.0 wt % polymer units derived from ethylene, and 70.0 to 90.0 wt % of a first polyethylene copolymer comprising 99.0 to 80.0 wt % of polymer units derived from ethylene and 1.0 to 20.0 wt % of polymer units derived from one or more C3 to C20 a-olefin comonomers; and d. a second polyethylene-containing intermediate layer interposing the inner layer and the second outer layer, the second polyethylene-containing intermediate layer comprising:
- 10.0 to 30.0 wt % of a third propylene-based elastomer, wherein the third propylene-based elastomer has a melt flow rate (230° C./2.16 kg) of 2.0 to 3.0 g/10 min and 5.0 to 15.0 wt % polymer units derived from ethylene, and
- 70.0 to 90.0 wt % of a second polyethylene copolymer comprising 99.0 to 80.0 wt % of polymer units derived from ethylene and 1.0 to 20.0 wt % of polymer units derived from one or more C3 to C20 a-olefin comonomers,
- wherein the second polyethylene-containing intermediate layer composition may be the same or different from the first polyethylene-containing intermediate layer composition;

wherein the multilayer film has a positive slope in the strain-strain curve in the region between 20.0% and 200.0% strain, and a stress value ≥8.5 MPa at strain of 20.0%.

2. The multilayer film of claim 1, having a stress value ≥9.0 MPa at strain of 20.0%.

3. The multilayer film of claim 1, having a stress value ≥10.5 MPa at strain of 100.0%.

4. The multilayer film of claim 1, wherein:
a. the first outer layer comprises from 80.0 to 100.0 wt % of the first polyethylene;
b. the second outer layer comprising from 80.0 to 100.0 wt % of the second polyethylene; and
c. an inner layer interposing the first and second outer layers, the inner layer comprising: 1) from 50.0 to 70.0 wt % of a third polyethylene, the third polyethylene having a g'$_{vis}$ of 0.85 to 0.98; and 2) 30.0 to 50.0 wt % of the polyethylene having a g'$_{vis}$ of 0.50 to 0.85.

5. The multilayer film of claim 1, wherein the first outer layer comprises 95.0 to 100.0 wt % of the first polyethylene, the first polyethylene having a composition distribution breadth index (CDBI) of 60% or more, a density of 0.910 to 0.925 g/cm$^3$, and a melt index of 0.3 to 2.0 g/10 min.

6. The multilayer film of claim 1, wherein the second outer layer comprises 95.0 to 100.0 wt % of the second polyethylene, the second polyethylene having a composition distribution breadth index (CDBI) of 60% or more, a density of 0.910 to 0.925 g/cm$^3$, and a melt index of 0.3 to 2.0 g/10 min.

7. The multilayer film of claim 1, wherein the inner layer comprises 55.0 to 65.0 wt % of a third polyethylene, the third polyethylene having a CDBI≥70%, a melt index, $I_{2.16}$, of about 0.1 to about 2.0 g/10 min., a density of from about 0.910 to about 0.930 g/cm$^3$, and a $M_w/M_n$ of about 2.5 to about 5.5.

8. A stretch hood film comprising the film of claim 1.

9. The multilayer film of claim 1, wherein the first polyethylene-containing intermediate layer comprises: 1) from 75.0 to 85.0 wt % of a fourth polyethylene, the fourth polyethylene having a CDBI≥70%, a melt index, $I_{2.16}$, of about 0.1 to about 2.0 g/10 min., a density of from about 0.910 to about 0.930 g/cm$^3$, and a $M_w/M_n$ of about 2.5 to about 5.5; and 2) 15.0 to 25.0 wt % of the second propylene-based elastomer.

10. The multilayer film of claim 1, wherein the second polyethylene-containing intermediate layer comprises: 1) from 75.0 to 85.0 wt % of the fifth polyethylene, the fifth polyethylene having a CDBI≥70%, a melt index, $I_{2.16}$, of about 0.1 to about 2.0 g/10 min., a density of from about 0.910 to about 0.930 g/cm$^3$, and a $M_w/M_n$ of about 2.5 to about 5.5; and 2) 15.0 to 25.0 wt % of the third propylene-based elastomer.

11. The multilayer film of claim 1, wherein:
a. the first outer layer comprises from 80.0 to 100.0 wt % of [the] first polyethylene;
b. the second outer layer comprising from 80.0 to 100.0 wt % of the second polyethylene; and
c. the inner layer comprises: 1) from 50.0 to 70.0 wt % of a third polyethylene, the third polyethylene having a g'$_{vis}$ of 0.85 to 0.98; and 2) 30.0 to 50.0 wt % of the first propylene-based elastomer,
wherein the first, second, and third polyethylenes may be the same or different.

12. The multilayer film of claim 11, wherein the melt flow rate of the second and third propylene-based elastomers is different from the melt flow rate of the first propylene-based elastomer.

13. The multilayer film of claim 11, wherein the first propylene-based elastomer has a melt flow rate (230° C./2.16 kg) of 2.5 to 3.5 g/10 min.

* * * * *